(12) United States Patent
Hohensee et al.

(10) Patent No.: US 9,007,617 B2
(45) Date of Patent: Apr. 14, 2015

(54) CONTROL OF USER-SENSITIVE INFORMATION IN A PRINT DATASTREAM

(71) Applicants: Reinhard H. Hohensee, Boulder, CO (US); Harry R. Lewis, Longmont, CO (US)

(72) Inventors: Reinhard H. Hohensee, Boulder, CO (US); Harry R. Lewis, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 15 days.

(21) Appl. No.: 13/857,889

(22) Filed: Apr. 5, 2013

(65) Prior Publication Data

US 2014/0300912 A1 Oct. 9, 2014

(51) Int. Cl.
*G06K 15/00* (2006.01)
*G06F 3/12* (2006.01)
*G06Q 10/06* (2012.01)
*G06K 15/02* (2006.01)

(52) U.S. Cl.
CPC .......... *G06K 15/4095* (2013.01); *G06F 3/1222* (2013.01); *G06F 3/1238* (2013.01); *G06F 3/1244* (2013.01); *G06F 3/1288* (2013.01); *G06Q 10/06* (2013.01); *G06K 15/1822* (2013.01); *G06K 15/181* (2013.01)

(58) Field of Classification Search
USPC .......................................................... 358/1.15
See application file for complete search history.

(56) References Cited

U.S. PATENT DOCUMENTS

| | | |
|---|---|---|
| 2005/0082354 A1 | 4/2005 | Black |
| 2008/0278750 A1 | 11/2008 | Lehotsky et al. |
| 2008/0304088 A1 * | 12/2008 | Tomihisa ........................ 358/1.9 |
| 2010/0046015 A1 * | 2/2010 | Whittle et al. ................. 358/1.9 |
| 2010/0060925 A1 | 3/2010 | Thomas |
| 2011/0199651 A1 | 8/2011 | Matsuno |
| 2013/0016401 A1 * | 1/2013 | Rijavec ........................ 358/3.06 |

FOREIGN PATENT DOCUMENTS

| | | |
|---|---|---|
| DE | 10218487 | 11/2003 |
| JP | 2002192792 A * | 7/2002 |
| JP | 2002237940 | 8/2002 |
| JP | 2008131421 | 6/2008 |

\* cited by examiner

*Primary Examiner* — Huo Long Chen
(74) *Attorney, Agent, or Firm* — Duft Bornsen & Fettig LLP

(57) ABSTRACT

Systems and methods provide print security for sensitive information in a print datastream. One embodiment comprises a controller that identifies sensitive information of a page of a print datastream, and identifies a secure presentation area defined for the page. The controller compares print locations defined for the sensitive information with the secure presentation area, and generates an alert if the sensitive information has a print location that is defined outside of the secure presentation area.

9 Claims, 5 Drawing Sheets

CONTROL OF USER-SENSITIVE INFORMATION IN A PRINT DATASTREAM

FIELD OF THE INVENTION

The invention relates to the field of printing systems, and in particular, to print datastreams.

BACKGROUND

Municipalities often provide curbside recycling services that can accept a number of items for recycling, such as paper, plastic, glass, metal, etc. However, some recycling services are reluctant to accept shredded paper documents. Paper is composed of fibers. As paper is recycled over and over, the fibers become shorter and the paper products that can be manufactured from the recycled paper becomes more limited. While short fiber recycled paper still has some value, it is not as valuable as larger sheets of paper documents that have long fibers.

Once documents are shredded, it shortens the fibers and lowers the grade of paper from high grade to mixed grade. Mixed grade paper may still be recyclable, but it may be more difficult to find a recycling service that accepts shredded documents. For instance, a curbside recycling service that a typical homeowner uses for recycling may not accept shredded documents at all, thus forcing the homeowner to find other means of recycling shredded documents.

Although personal information may not exist on every page of a multi-page document, users generally shred the entire document to ensure that any personal information is not accessible after recycling. For instance, it would be unlikely that a user would simply include a bank statement, a credit card statement, a trading account statement, etc., in the common non-shredded paper recycling stream, as this would potentially result in a third party gaining access to the personal information of the user.

To minimize the number of pages or overall area for a particular document that should be shredded to destroy the personal information, the user may be tasked with locating various pieces of sensitive information that are dispersed throughout the document. However, the possibility remains that some piece of information may be missed. Users therefore often shred the entire document to prevent this from happening, which can generate a significant amount of hard-to-recycle material.

SUMMARY

Embodiments described herein ensure that sensitive information in a print datastream cannot be printed outside of secure presentation areas on a page. The secure areas on the page may be readily identified in a printed output of the datastream, thereby allowing a user to separate the secure areas from the remaining document for secure disposal (e.g., by shredding the secure portion area of the page). The user may then dispose of the remaining portion of the document without concern that it includes sensitive information of the user.

One embodiment is a controller that is operable to identify sensitive information of a page of a print datastream, and to identify a secure presentation area defined for the page. The controller is further operable to compare print locations defined for the sensitive information with the secure presentation area, and to generate an alert if the sensitive information has a print location that is defined outside of the secure presentation area.

Another embodiment is a method to provide print security for sensitive information in a print datastream. The method comprises identifying sensitive information of a page of a print datastream, and identifying a secure presentation area defined for the page. The method further comprises comparing print locations defined for the sensitive information with the secure presentation area, and generating an alert if the sensitive information has a print location that is defined outside of the secure presentation area.

Another embodiment is a non-transitory computer readable medium embodying programmed instructions executable by a processor. The instructions are operable to direct the processor to identify sensitive information of a page of a print datastream, and to identify a secure presentation area defined for the page. The instructions further direct the processor to compare print locations defined for the sensitive information with the secure presentation area, and to generate an alert if the sensitive information has a print location that is defined outside of the secure presentation area.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
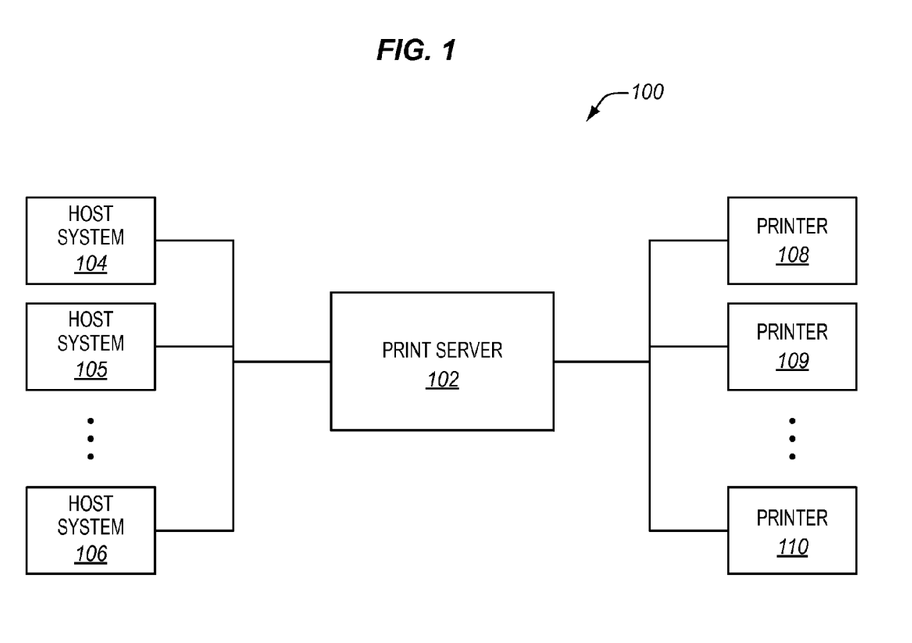
FIG. 1 is a block diagram of a printing system in an exemplary embodiment.

FIG. 1 is a block diagram of a printing system 100 in an exemplary embodiment. Printing system 100 includes a print server 102 that couples host system 104-106 to printers 108-110. Generally, print server 102 receives print jobs from host systems 104-106 and schedules the jobs for printing at one or more of printers 108-110. Printers 108-110 includes any printing device that is able to mark a printable media (e.g., mark a colorant to paper). Some examples of printers 108-110 include continuous form production printers for high speed/high volume printing.

The print jobs and/or print datastreams generated by host systems 104-106 may include a variety of data formats as a matter of design choice. For instance, the jobs may be formatted as a Page Description Language (PDL), such as Advanced Function Presentation Mixed Object Document Content Architecture (AFP MODCA), Portable Document Format (PDF), Open Extensible Markup Language (XML) Paper Specification (OpenXPS), Extensible Stylesheet Language Formatting Objects (XLS-FO), Postscript, etc.

PDLs generally describe print data at a higher level than an output bitmap for the data. For instance, PDLs may describe presentation data objects within a logical page for display on a printed output for the page. Data objects may include text, graphics, images, bar codes, etc., and the controls or instructions for presenting the data on a particular location on a page. PDLs may also have the ability to describe an object area or presentation area for a page. Object areas for a page may be considered to be subsets of the page used for presenting data objects. Object areas typically are defined with size information, rotation, and position within a page. Object areas may also define other characteristics of the area on the page such as color profile information. Using object areas in a PDL allows for different portions of a page to have unique display characteristics.

In some cases, jobs printed by system 100 may include information that is of a sensitive nature. For example, the jobs may be billing statements, bank statements, trade account statements, etc., that are printed and mailed to customers. Often, these types of printed documents include social security numbers, account number, etc., that a customer may not want distributed to a third party. Thus, a customer will often shred the documents when they are no longer needed.

One problem with shredding the entire document is that it generates a significant amount of lower grade paper that is not easily recyclable. To minimize the number of pages for a particular document that should be shredded to destroy the sensitive information, the customer may be tasked with locating various pieces of sensitive information that are dispersed throughout the document. However, the possibility remains that some piece of information may be missed by the customer. When a billing entity generates a statement for a customer, the billing entity may attempt to confine the sensitive information within easily identifiable areas of a document. However, not all entities may do this for the customer. Further, the possibility remains that some sensitive information may print on different portions of the document than originally intended when the document was created. For example, intervening workflow steps introduce the possibility for disrupting the original intent. For instance, print jobs received by print server 102 may be processed to include advertisements, text, watermarks, or other types of features that may re-arrange the print locations of the sensitive information. Further, jobs received by printers 108-110 may perform similar processing activities that re-arrange the print locations of the sensitive information.

Figure 2:
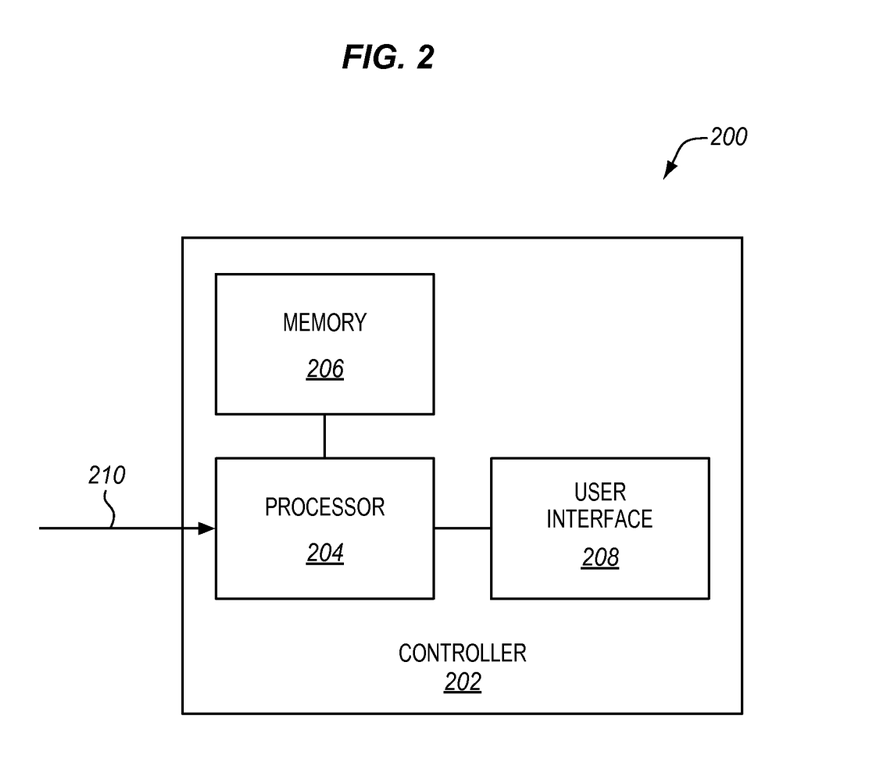
FIG. 2 is a block diagram of a data protection system in an exemplary embodiment.

FIG. 2 illustrates a data protection system 200 in an exemplary embodiment. System 200 may be included in host systems 104-106, in print server 102, and/or in printers 108-110. System 200 includes a controller 202 which includes any component, system, or device that is able to ensure that sensitive information in a print datastream cannot be printed outside of secure presentation areas on a page. The secure areas on the page may then be readily identified in a printed output of the datastream, thereby allowing a customer to separate the secure areas from the remaining document for secure disposal (e.g., by shredding the secure portion area of the page). The customer may then recycle the remaining portion of the document without concern that it includes sensitive information for the user.

In this embodiment, controller 202 includes a processor 204, a memory 206, and a user interface 208. Processor 204 includes any device that is able to execute instructions to perform various functions. Memory 206 includes any electronic or electro-mechanical device that is able to store information. Some examples of memory 206 include Random Access Memory (RAM), flash, solid state drives, disk drives, etc. User interface 208 includes any device that is able to present information to, and/or receive information from, a user. Some examples of user interface 208 include Graphical User Interfaces (GUIs), messaging services such as Short Messaging Service (SMS), email, etc.

Consider an example whereby a billing entity generates a print datastream for one or more printers 108-110. The print datastream in this embodiment includes information that may be sensitive to a customer, such as a bank statement. In this embodiment, the billing entity attempts to format the datastream such that the sensitive information is defined for printing within secure presentation areas on one or more pages of the document. However, sometimes mistakes are made when generating the datastream. Further, sometimes downstream processing of the datastream results in the sensitive information being moved outside of the secure presentation areas of the document.

Figure 3:
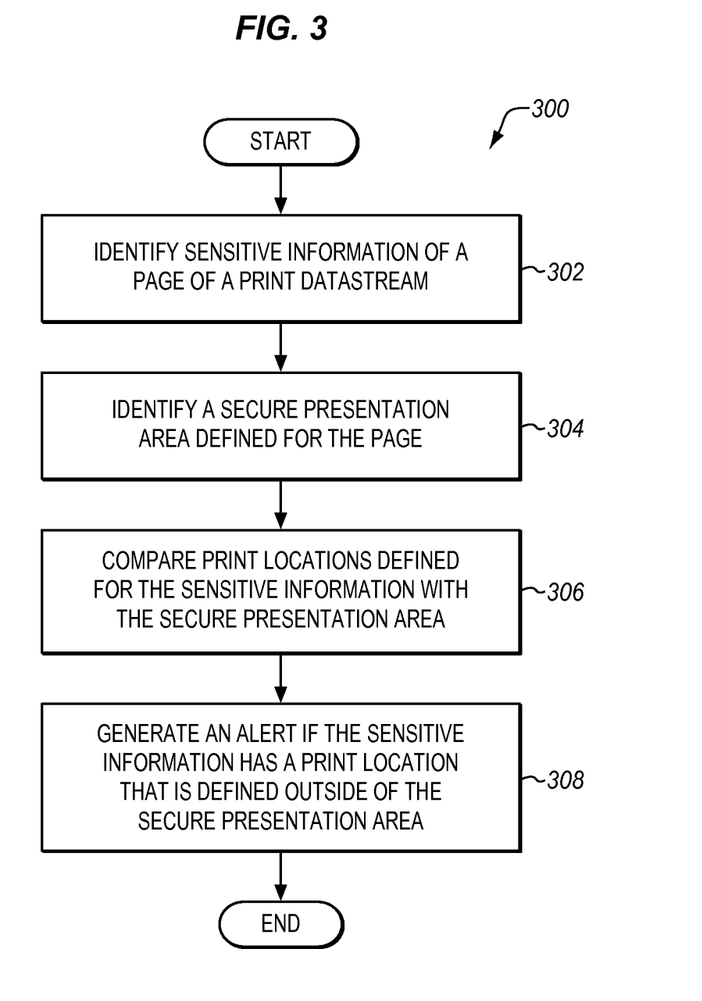
FIG. 3 is a flowchart illustrating a method to provide print security for sensitive information in a print datastream in an exemplary embodiment.

FIG. 3 is a flowchart illustrating a method to provide print security for sensitive information in a print datastream in an exemplary embodiment. The steps of method 300 will be described with reference to controller 202 of FIG. 2, but those skilled in the art will appreciate that method 300 may be performed in other systems. The steps of the flowchart(s) described herein are not all inclusive and may include other steps not shown. The steps described herein may also be performed in an alternative order.

Figure 4:
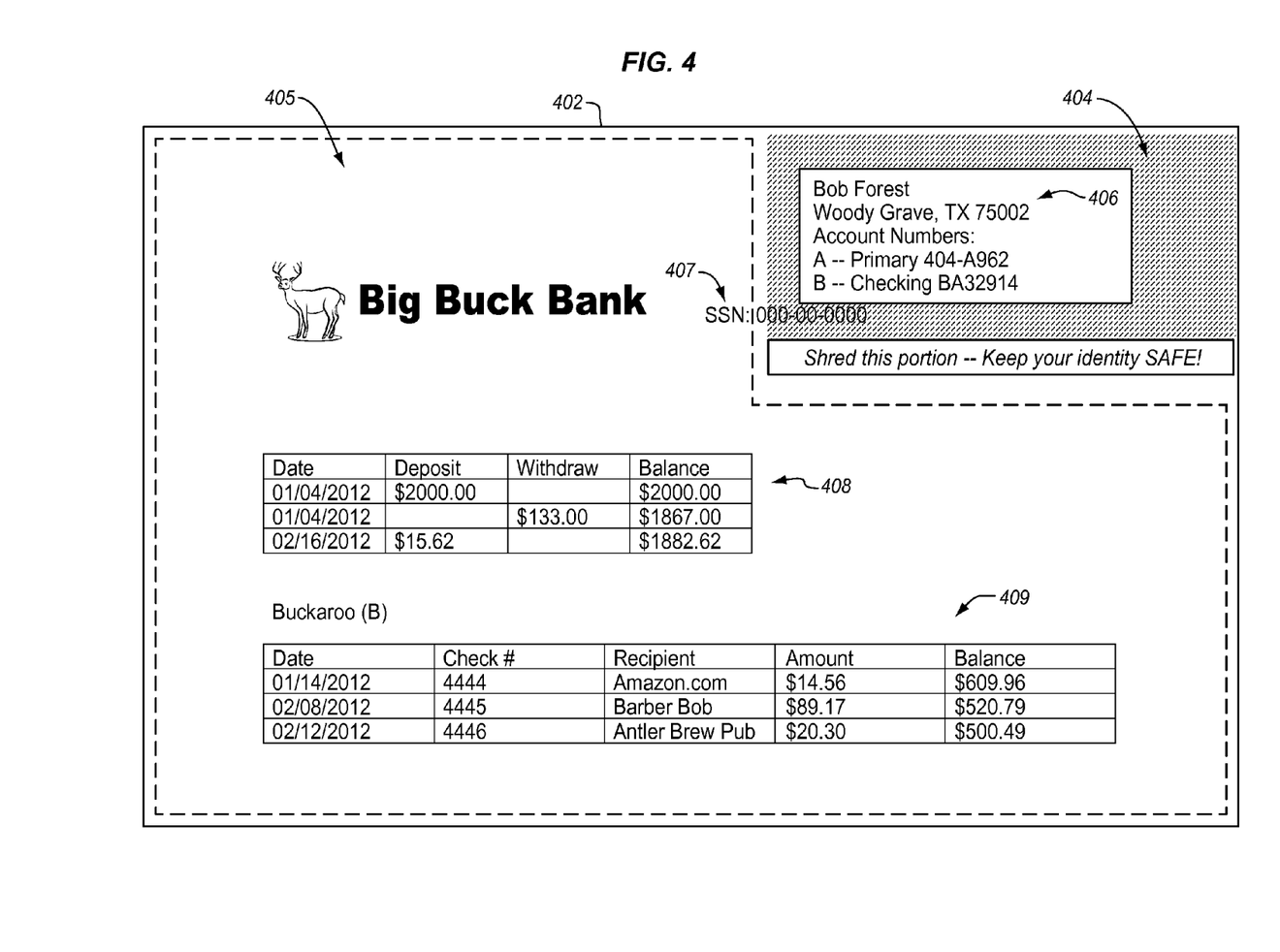
FIG. 4 is a block diagram of a page of a print datastream in an exemplary embodiment.

In step 302, processor 204 identifies sensitive information of a page of a print datastream 210 (see FIG. 2). FIG. 4 is a block diagram of a print view of a page 402 of a print datastream in an exemplary embodiment. Page 402 illustrates how the page would look if printed for purposes of discussion. In this embodiment, page 402 includes presentation areas 404-405, and information 406-409. Information 406-407 in this example is of a sensitive nature. Information 406 includes account numbers for the customer, and information 407 includes a social security number of the customer. Further, presentation area 404 in this embodiment is defined as a secure presentation area for displaying sensitive information, and presentation area 405 is defined as a non-secure presentation area for displaying non-sensitive information.

To identify sensitive information 406-407, processor 204 may temporarily store a page of print datastream 210 in memory 206, and process the page to identify text, graphics, images, bar codes, etc. Processor 204 may use key words, tags, markers, XML data, or other features to identify sensitive information 406-407. For instance, if datastream 210 is a PDL datastream, then processor 204 may analyze the objects in the page to identify tags or other markers that identify the objects as being of a sensitive nature. As discussed previously, PDLs often define presentation data as self-contained objects that include the data to print and control information regarding how and/or where the data will print within a page. Thus, identifying sensitive objects within the page may also provide information regarding how and/or where the objects will print with respect to any presentation areas defined within the page. One example of an object tag in AFP is a Presentation Control (X'83') triplet at the beginning of a structured field of presentation objects. In some embodiments, the X'83' triplet may be modified to tag objects in the structured field as including sensitive information. For instance, a flag bit may be added to the X'83' triplet to tag objects as including sensitive information.

In step 304, processor 204 identifies a secure presentation area 404 defined for the page. To identify secure presentation area 404, processor 204 may process the page to identify key words, tags, markers, XML data, or other features to locate the secure presentation area (e.g., area 404 of FIG. 4) within the page. For instance, if datastream 210 is a PDL datastream, then processor 204 may analyze the areas in the page to identify tags or other markers that identify the areas as being defined for displaying sensitive information. As discussed previously, PDLs often define areas within a page for presenting data objects. The areas may define color profiles or other features for the presentation objects that are defined to display within the area. One example of an area tag in AFP is an Area Definition (X'4D') triplet, which is used to define an area on a page. In some embodiments, the X'4D' triplet may be modified to indicate that the area is defined for presenting sensitive information on a page. For instance, a flag bit may be added to the X'4D triplet.

In step 306, processor 204 compares print locations defined for the sensitive information with secure presentation area. For instance, processor 204 may compare a print location of sensitive information 406-407 with an area on the page that is defined by secure presentation area 404. In this embodiment, sensitive information 406 is within the area on the page 402 that is defined by secure presentation area 404, and sensitive information 407 is outside of the area on page 402 that is defined by secure presentation area 404.

Sensitive information 407 may be outside of secure presentation area 406 for a number of reasons. For instance, datastream 210 may have been generated incorrectly by one of host systems 104-106, datastream 210 may have been modified by print server 102 (e.g., by inserting information in datastream 210 prior to printing), and/or datastream 210 may have been modified by one of printers 108-110 (e.g., by substituting fonts, images, etc.).

In step 308, processor 204 generates an alert if the sensitive information has a print location that is defined outside of the secure presentation area. In this example, sensitive information 407 is defined outside of secure presentation area 406. Therefore, processor 204 generates an alert to indicate this (e.g., utilizing user interface 208). Some examples of an alert include SMS messages, emails, indications at a GUI, etc.

For example, if controller 202 is monitoring print data generated at host systems 104-106, then processor 204 provides an alert to a print operator indicating that the format for the print data is incorrect for secure presentation of data. This allows the operator to correct the error, thus ensuring that sensitive information 407 in datastream 210 cannot be printed outside of secure presentation area 404. If controller 202 is monitoring print data processed by print server 102, then processor 204 provides an alert to a print operator indicating that some activity at print server 102 may have modified the print data, thereby rendering the format for the print data incorrect for secure presentation of data. In like manner, if controller 202 is monitoring print data processed by printers 108-110, then processor 204 provides an alert to a print operator indicating that some activity at printers 108-110 may have modified the print data, thereby rendering the format for the print data incorrect for secure presentation of data.

In some embodiments, controller 202 may perform additional activities in response to determining that sensitive information 407 has a print location that is defined outside of secure presentation area 404. For instance, if controller 202 is monitoring print data generated by host systems 104-106, then controller 202 may suspend an activity to send the print data to print server 102 for processing in response to the alert, thereby ensuring that sensitive information 407 cannot be printed outside of secure presentation area 404. If controller 202 is monitoring print data at print server 102, then controller 202 may terminate the scheduling of print data for printing in response to the alert. In like manner, if controller 202 is monitoring print data at printers 108-110, then controller 202 may terminate the printing of the print data in response to the alert. Because controller 202 may operate independently in each of host systems 104-106, print server 102, and printers 108-110, many possibilities exist for controller 202 to identify problems that may arise as datastream 210 is generated, processed, and printed by printing system 100. This ensures that sensitive information in a print datastream cannot be printed outside of secure presentation areas on a page.

Figure 5:
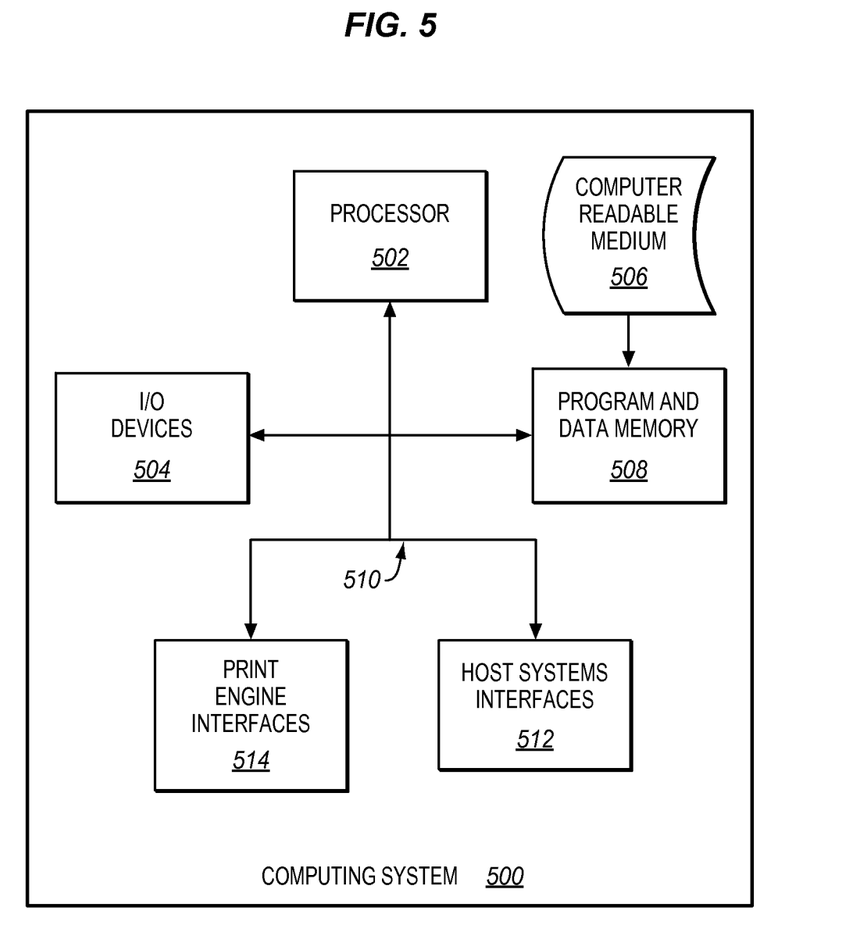
FIG. 5 illustrates a processing system operable to execute a computer readable medium embodying programmed instructions to perform desired functions in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 5 illustrates a computing system 500 in which a computer readable medium may provide instructions for performing the method of FIG. 3 in an exemplary embodiment.

Furthermore, the invention can take the form of a computer program product accessible from a computer-usable or computer-readable medium 506 providing program code for use by or in connection with a computer or any instruction execution system. For the purposes of this description, a computer-usable or computer readable medium 506 can be any apparatus that can contain, store, communicate, or transport the program for use by or in connection with the instruction execution system, apparatus, or device.

The medium 506 can be an electronic, magnetic, optical, electromagnetic, infrared, or semiconductor system (or apparatus or device) or a propagation medium. Examples of a computer-readable medium 506 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution.

Input/output or I/O devices 504 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 512, or remote printers or storage devices through intervening private or public networks. Modems, cable modem and Ethernet cards are just a few of the currently available types of network adapters. System 500 further includes print engine interfaces 514.

Although specific embodiments were described herein, the scope of the invention is not limited to those specific embodiments. The scope of the invention is defined by the following claims and any equivalents thereof.

We claim:

1. A data protection system comprising:
a controller configured to identify sensitive information of a page of a print datastream, and to identify a secure presentation area defined for the page;
wherein the print datastream is in a Page Description Language (PDL);
wherein the controller is further configured to identify an object tag that identifies presentation objects defined by the PDL as including sensitive information, and to identify the sensitive information based on the objects for the page that include the object tag;
wherein the controller is further configured to identify an area tag that identifies areas defined by the PDL for displaying the sensitive information, and to identify the secure presentation area based on areas defined for the page that include the area tag;
the controller further configured to compare print locations defined for the sensitive information with the secure presentation area, and to generate an alert if the sensitive information has a print location that is defined outside of the secure presentation area;
wherein the PDL datastream is an Advanced Function Presentation (AFP) datastream;
wherein the object tag that identifies the objects defined by AFP as including sensitive information is a modified Presentation Control (X'83') triplet;
wherein the area tag that identifies the areas defined by AFP for displaying the sensitive information is a modified Area Definition (X'4D') triplet.

2. The system of claim 1:
wherein the AFP print datastream is included in a print job; and
wherein the controller is further configured to terminate printing of the print job if the sensitive information has a print location that is defined outside of the secure presentation area.

3. The system of claim 1:
wherein the AFP print datastream is included in a print job; and
wherein the controller is further configured to terminate scheduling of the print job to a printer if the sensitive information has a print location that is defined outside of the secure presentation area.

4. A method comprising:
identifying sensitive information of a page of a Page Description Language (PDL) print datastream by:
identifying an object tag that identifies presentation objects defined by the PDL as including sensitive information; and
identifying the sensitive information based on the objects for the page that include the object tag;
identifying a secure presentation area defined for the page by:
identifying an area tag that identifies areas defined by the PDL for displaying the sensitive information; and
identifying the secure presentation area based on the areas defined for the page that include the area tag;
comparing print locations defined for the sensitive information with the secure presentation area; and
generating an alert if the sensitive information has a print location that is defined outside of the secure presentation area;
wherein the PDL datastream is an Advanced Function Presentation (AFP) datastream;
wherein the object tag that identifies the objects defined by AFP as including sensitive information is a modified Presentation Control (X'83') triplet;
wherein the area tag that identifies the areas defined by AFP for displaying the sensitive information is a modified Area Definition (X'4D') triplet.

5. The method of claim 4:
wherein the AFP print datastream is included in a print job; and
wherein the method further comprises:
terminating a printing of the print job if the sensitive information has a print location that is defined outside of the secure presentation area.

6. The method of claim 4:
wherein the AFP print datastream is included in a print job; and
wherein the method further comprises:
terminating a scheduling of the print job to a printer if the sensitive information has a print location that is defined outside of the secure presentation area.

7. A non-transitory computer readable medium embodying programmed instructions executable by a processor, the instructions operable to direct the processor to:
identify sensitive information of a page of a Page Description Language (PDL) print datastream by directing the processor to:
identify an object tag that identifies presentation objects defined by the PDL as including sensitive information; and
identify the sensitive information based on the objects for the page that include the object tag;
identify a secure presentation area defined for the page by directing the processor to:
identify an area tag that identifies areas defined by the PDL for displaying the sensitive information; and
identify the secure presentation area based on the areas defined for the page that include the area tag;
compare print locations defined for the sensitive information with the secure presentation area; and
generate an alert if the sensitive information has a print location that is defined outside of the secure presentation area;
wherein the PDL datastream is an Advanced Function Presentation (AFP) datastream;
wherein the object tag that identifies the objects defined by AFP as including sensitive information is a modified Presentation Control (X'83') triplet; and
wherein the area tag that identifies the areas defined by AFP for displaying the sensitive information is a modified Area Definition (X'4D') triplet.

8. The non-transitory computer readable medium of claim 7:
wherein the AFP print datastream is included in a print job; and
wherein the instructions further direct the processor to:
terminate a printing of the print job if the sensitive information has a print location that is defined outside of the secure presentation area.

9. The non-transitory computer readable medium of claim 7:
wherein the AFP print datastream is included in a print job; and
wherein the instructions further direct the processor to:

terminate a scheduling of the print job to a printer if the sensitive information has a print location that is defined outside of the secure presentation area.

\* \* \* \* \*